Jan. 24, 1933. W. H. JONES 1,895,191
BOX TOOL FOR AUTOMATIC AND TURRET OR CAPSTAN LATHES OR MACHINES
Filed Jan. 7, 1931
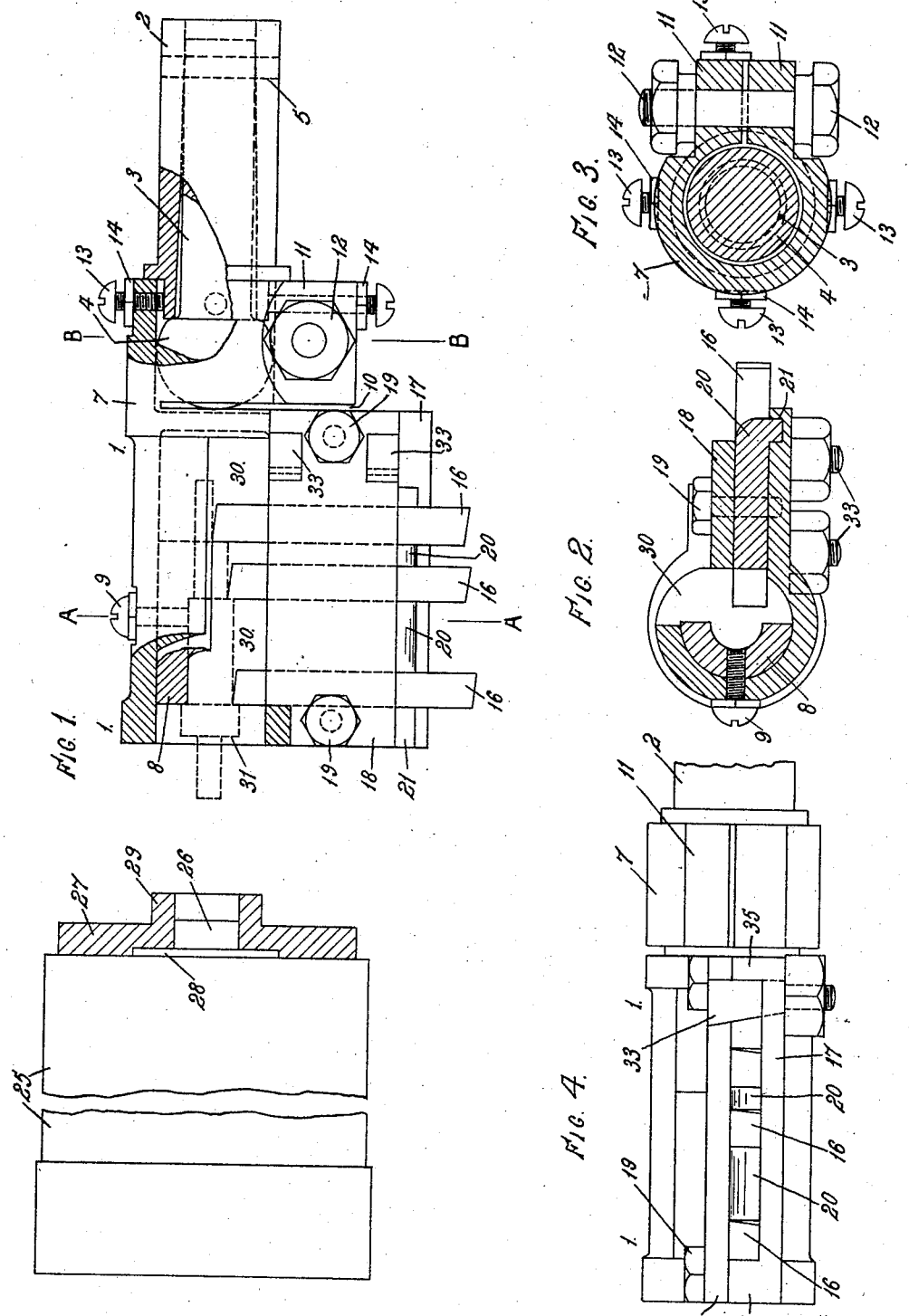
INVENTOR
W. H. JONES
BY [signature] ATT'Y.

Patented Jan. 24, 1933

1,895,191

UNITED STATES PATENT OFFICE

WILLIAM HENRY JONES, OF WALLASEY, ENGLAND

BOX TOOL FOR AUTOMATIC AND TURRET OR CAPSTAN LATHES OR MACHINES

Application filed January 7, 1931, Serial No. 507,255, and in Great Britain January 18, 1930.

This invention has reference to box tools or holders of machines of the automatic, turret or capstan kind for making steel or other metal articles, as, for instance rivets, pins, bolts or other articles which are formed by turning, in which the tools proper are carried in the outer end of the holder, which is disposed at a distance, or remote from the other end which is fixed in the capstan or other tool holder carrying part.

The objects of this invention are to provide improvements hereinafter described, in connection with the above kind of tool holder, used in machines of the kind concerned which render such tool holders simple and easily worked or used, as hereafter explained, and promote accuracy of work performed.

In a machine tool holder or box tool according to this invention, the outer parts of the holder or box which carries the cutting tools proper, have a limited free movement or play in relation to the inner end which is fixed in the turret or capstan; and there is provided and used in connection with this tool box or holder, a setting device adapted to be temporarily applied and fitted to the chuck of the lathe or machine, with which device the leading end of the box tool part which carries the cutters operates. That is this temporary chuck device is used in the setting action of the tool box, and after the setting of the box as described, it is removed from the chuck, and then the operation of making the rivets, pins, or other articles can proceed.

The part of the box tool or holder on which the tools or cutters proper are carried, may be tubular in form, and is adapted to receive and hold changeable bushes, the inner surfaces of which are of the configuration of the surface of the rivet, pin or other article to be produced; and the bush may be of semicircular form, and as the rod or bar to be operated on is fed forward from the chuck into the tubular outer end of the holder, it is while being operated upon by the cutters, supported at the opposite side to the cutters by the interior surface of the bush, which may be fixed in position by a screw or the like screwing into same through the back portion of the tubular part.

Within the inner sleeve portion which is fixed in the turret, capstan or other part of the lathe or machine, is an inner stem fixed to the sleeve at its inner end only, and having at its outer end a bulbous head which fits in a tubular chamber in the inner end of the outer tubular part of the cutter carrier portion proper; and it is held in this chamber by means of set screws or devices as hereafter explained.

The said stem with the bulb head, has a small amount of freedom or play in the sleeve, say by making it slightly smaller than the interior of the sleeve, or making one or other part tapered, and this play or freedom will function always in the operation of cutting and making of the articles; so that in cases where there is not absolute alignment or accuracy of a position or setting between the inner end of the tool holder or box, and the axes of the chuck and rod being operated upon, the work will be truly and accurately performed. And this construction of tool holder is also operative in setting of the tool box in the capstan or turret, and promotes accuracy; namely, when the fore end of the tubular portion of the tool carrier is being set in connection with the removable setting device temporarily used in connection with the chuck, the small freedom or play provides for the true and desired setting of the holder.

As an example one form of the invention is illustrated in the accompanying drawing.

In the drawing hereto annexed, Figure 1 is an elevation partly in section, showing the holder, and the chuck; Figures 2 and 3 are cross sections at AA and BB Figure 1; and Figure 4 is a side elevation of the holder.

Referring to the drawing, 1 generally designates the outer tubular part of the box tool or holder, in which the cutters or tools proper are carried, and into which the part of the rod or metal to be operated upon is introduced. 2 is the sleeve part of the box or holder which is fixed and immovably held in the turret, capstan or other support of the automatic machine or lathe. 3 is the stem having the bulbous head 4 which fits in the sleeve 2, and is held at its inner end only by a rivet 5, and slight clearance between the stem 3 and the interior of the sleeve 2 is provided, as indicated by the double lines in the drawing, so that there is some small play or movement possible between these parts.

The front or outer portion 1 of the holder, which carries the cutting tools proper, comprises a tubular or barrel portion at the forward end, and a hollow socket portion 7 at the back end, within which the bulb 4 of the stem 3 fits; this socket part being closed at its inner end, against which the end of the bulb 4 comes when the parts are fitted together.

Within the outer end of the tubular part 1 is placed the removable half bush 8, made internally of a form to correspond with the form of the article to be produced, and which is fixed in position by a screw 9, which screws into it as shown, from the back to the tubular part.

In the case shown the parts 1 and 7 are made in one piece, but a gap 10 is cut in between the socket portion 7, and the tubular part 1 as shown; and this part 7 is split at the front, and has two flanges 11, which are normally held together by a screw bolt 12, which when slack will allow the part 7 to spring open somewhat, and enable the bulb or head 4 of the stem 3 to be placed in position in the socket 7.

When the sleeve 2 and stem 3 are placed in position in the socket part 7, the bolt 12 will be tightened up, and then the screws 13 provided in the end of the socket part 7—which will have been slacked back—will be screwed up to the required degree after the part 1 has been set in position in relation to the chuck. As will be seen, the screws 13 are set in the required position in relation to the inner end of the sleeve which fits within the back end of the socket part 7; and when the screws 13 have been screwed up to the required degree, they are fixed in position and clamped by lock nuts 14, but they should not be screwed up tight so as to render the fixing too rigid.

In the case shown, there are three cutting tools 16, and they are supported on a table 17 which is an outward extension of the lower part of the tubular part 1 of the holder, and they are held in position by a clamping plate 18, which is pressed down on to the top of the tools by a stud or bolt 19 at each end.

Between the tools spacing devices 20 are introduced, the inner ends of which project downwards, and fit in a holding channel 21 in the table, so that they are held as regards radial movement, and different widths of spacing devices will be used according to the required spacing of the tools or cutters 16.

For the purpose of promoting true alignment of the axes of the chuck 25 and bar which is fed through it, in relation to the tubular part 1 when setting up the box tool, a disc 27 is employed in connection with the chuck and fits over the projecting end of the short bar 28 of the size of the bar to be operated upon, which is temporarily placed in the chuck when setting the tools in the lathe or machine; and on the face of the disc is a tubular ring or nose 29, the external diameter of which is practically the internal diameter of the end of the tubular part 1, which at this part is in the form of a complete ring, as shown; and when the tool holder is being set in position this ring will pass over the nose or flange 29, so that the part of the box tool or holder which carries the cutting tools will be truly in alignment with the chuck and work when pressure is applied from the turret slide, the bolt 12 and screws 13 being adjusted as required while this pressure is maintained.

As regards the above centering device, I make no claim to same except as used in connection with my improved tool holder.

As will be seen in Figures 1 and 2, the quarter of the tubular part 1 is cut away between the highest point and the horizontal plane in which its axis lies, this opening being designated 30; and through this opening the tools and work can be seen by the operator, and this facilitates also the setting of the tools.

The cutting tools of this holder are adapted to be set on a bench or table; and this is enabled to be done by the use of a dummy or model rivet, bolt or the like, of the configuration and size to be made. This dummy or model pin or device is marked 31, and shown in dotted lines in Figure 1, and it consists of three parts, a head part at one end of largest diameter, the smallest part at the opposite end, and an intervening body part of medium diameter. This small end is prolonged as shown, and this part is semi-cylindrical, so that when the end cutting off tool nearest the turret is adjusted up to the flat of this end its edge will project exactly half way across the rivet, so that it will operate as desired on the end of same.

In connection with this model or dummy device, a corresponding internally shaped semi-circular bush 8 will be used, as shown by the drawing; and when this bush is inserted in the holder at the bench, and the dummy or model 31 is placed in it, then the edges of the cutting tools 16 can be adjusted up to the surface of the different parts of the dummy or model, and then clamped in position; and this will be the required position of the tools for actual work.

If the rivet or pin to be made is short, by using a model of the form shown and described, the model is certain to be pressed by the tools in setting them, so as to lie truly on the interior or surface of the bush along its complete length, and thus the proper setting of the tools is assured.

In actual work when the rod 26 is fed forward, the article produced will be true and accurate in all respects, which is the ultimate object required.

When the holder is to be fixed in position in the lathe or machine, after the cutters 16 have been set and fixed, the setting disc 27 is placed over the end of the bar which is held in the chuck temporarily, and then the tool holder is brought up towards it, so that the nose or flange 29 of the disc 27 enters the fore end of the tubular part 1; and pressure is applied by the turret slide to ensure that the part 1 lies quite flat against the disc 27 and the disc against the chuck before the bolt 12 is tightened.

When the screws 13 have been adjusted in relation to the outer end of the sleeve 2 as above described, the holder is removed, and the setting disc 27 and short bar 26 taken away, whereupon the holder is in position in which the operation of the apparatus can commence.

After the bulb 4 has entered the socket 7, the small set screws 13 are screwed up to touch the inner end of the sleeve 2 behind the bulb, and then they are slightly slacked back to give the small amount of movement or play between the parts 2 and 1, and then locked in this position by the lock nuts 14.

The tools or cutters 16 and front distance devices 20 are fixed and clamped in the longitudinal direction by means of wedge bolts 33 which are passed through holes in the tool table 17, and by screwing up the nuts of these bolts beneath the table, the wedges will force all the parts up against the flange 34 of the table 17 at the outer end of the table, whilst the back of the wedge bolts will be supported by a flange 35 on the opposite side of the table; but other means of securing these tools in position on the table may be used.

By this invention, as stated, a high degree of accuracy can be obtained in the setting of the tool holder in the turret capstan or other carrier in relation to the chuck of the machine and the work; and corresponding, a high degree and constancy of accuracy or truth can be obtained in the articles produced in the machine; which as is well known is the great aim in connection with machines of this kind; and in addition to this, the setting of the tools in the manner described, which this invention enables to be done, promotes also this accuracy and uniformity of product.

As is known, inaccuracies or the absence of constant uniformity of the product of machines of the kind concerned, is due largely to the difficulty of so constructing them that absolute truth of relative position and adjustment between the turret, capstan or the like, and the chuck is extremely difficult; and this continuous accuracy of work or product is more difficult of accomplishment, in the longer or larger species of article to be produced than in the shorter or smaller ones. Also the setting up of tools as generally practised on these machines, in itself offers a great obstacle to the attainment of accuracy of production.

What is claimed is:—

1. A machine box tool comprising an inner sleeve part to be fitted in the turret of the machine, a stem fitting within and having limited play relative to the sleeve part, one end of the stem projecting beyond the sleeve and being formed as a ball, and a tool carrying part having means to removably clamp the tools thereon, said tool carrying part being formed with a socket to cooperate with the ball at the end of the stem for rotary adjustment of the tool carrying part relative to the sleeve part.

2. A machine box tool comprising an inner sleeve part to be fitted in the turret of the machine, a stem fitting within and having limited play relative to the sleeve part, one end of the stem projecting beyond the sleeve and being formed as a ball, a tool carrying part having means to removably clamp the tools thereon, said tool carrying part being formed with a socket to cooperate with the ball at the end of the stem for rotary adjustment of the tool carrying part relative to the sleeve part, and means whereby the ball receiving socket of the tool carrying part and the sleeve part may be fixed in relative adjustment.

In testimony whereof I have signed my name to this specification.

W. H. JONES.